United States Patent Office 2,748,003
Patented May 29, 1956

2,748,003

CITRUS PEEL PRODUCT AND METHOD

Walter F. Straub, Chicago, Ill., assignor to W. F. Straub & Company, Chicago, Ill., a corporation of Illinois No Drawing. Application June 4, 1952,
Serial No. 291,793

11 Claims. (Cl. 99—102)

This invention relates to a novel citrus peel product and to a method of preparing the same.

Shredded or cut citrus fruit peel is a highly desirable product useful in baking and the like and is in particular demand by commercial baking and confectionary establishments. Heretofore, citrus fruit peel of this character has been available principally in the form of a suspension or mixture of the peel with a relatively thick sugar syrup. Because of the tendency of citrus peel to deteriorate rapidly it has been considered necessary to employ a relatively large quantity of sugar syrup as a preservative in this type of product. For example, it is quite common for such products to contain more than 50% by weight of sugar syrup. In addition, the preparation of this type of citrus peel product usually involves a rather long period of heat treatment or cooking in order to insure proper preservation of the finished product.

Obviously, the citrus peel product just described possesses the serious objection that the consumer, who is interested primarily in the citrus peel, must also pay for a relatively large proportion of sugar syrup which is often not needed or desired for the ultimate use of the product. Thus, the sugar syrup type of citrus peel product is not only more expensive from the point of view of the ingredients contained therein but there is also another important factor involved, namely, the increased cost of transportation. Since the product must necessarily be prepared in the citrus-fruit growing regions, the ultimate user must pay for the cost of shipping the sugar syrup content of the product as well as the desired citrus peel. In addition to the relative expensiveness of the sugar syrup-citrus peel product, there are also limitations on its use since it does not meet with certain requirements of the commercial baker or confectioner. For example, this type of product is not suitable for the commercial production and sale of an orange bar similar to the well known fig bar which has been popular for many years. Also, citrus fruit peel such as orange peel is highly desirable as a topping for coffee cakes, sweet rolls, and other baked goods, but the sugar syrup product is obviously unsuited for such use.

A further, and perhaps the most objectionable, disadvantage of the citrus peel products heretofore available is that the citrus peel portion of the product possesses an undesirable toughness or "leatheriness" of texture which detracts seriously from the palatability of baked goods or confections containing the citrus peel. Although the sugar syrup if used in sufficiently large quantities tends to prevent excessive "leatheriness" of the citrus peel, it does not overcome the toughness of the citrus peel, especially after the latter has been incorporated in baked goods or a confection.

An attempt has been made to overcome the high cost of the sugar syrup-citrus peel product by merely heat processing the citrus peels in hermetically sealed containers. However, the use of this type of product is extremely limited because the citrus peel is excessively tough and because much of the intrinsic flavor of the citrus peel is lost in the heat processing technique. Thus, while there is a very definite demand and market for citrus peel, no one has heretofore made available a suitable citrus peel product in commercial quantities.

Accordingly, it is a primary object of my invention to provide a novel citrus peel product which overcomes the objectional features of the citrus peel products heretofore proposed.

Another object of the invention is to provide a novel citrus peel product which is characterized by increased tenderness, improved flavor, and greater palatability as compared with the products heretofore available.

A further object of the invention is to provide a novel citrus peel product which contains the desired citrus peel in high concentrations and eliminates the necessity of including relatively large amounts of sugar syrup.

An additional object of the invention is to provide a novel citrus peel product which is highly economical to prepare and sell and which can be readily used for a wide variety of commercial baking and confectionary purposes.

Broadly speaking, the novel feed product of my invention contains citrus peel in shredded, cut, ground, or other subdivided form together with liquid honey, the honey being present preferably in a relatively minor proportion as compared to the citrus peel. In one embodiment of the invention the honey comprises an additive to the sugar syrup medium for the citrus peel. In the preferred embodiment of the invention the product is in the form of a concentrate consisting essentially of citrus peel and a relatively minor amount of honey but no sugar syrup.

My invention is predicated on the discovery that liquid honey possesses the novel property of tenderizing or plasticizing shredded or subdivided citrus peels so that the peel is maintained in a highly acceptable and palatable condition. This tenderizing effect of honey on the cellulose fibers of citrus peels is a specific effect which is substantially independent of the moisture content of the citrus peel. In other words, although liquid honey is also a humectant or hygroscopic agent capable of maintaining a desired moisture content in citrus peel, the honey also exerts a very definite and measurable tenderizing action over and above the softening effect of moisture. I have found that citrus peels of the same moisture content have substantially greater tenderness when combined with liquid honey than when combined with sugar syrups or the like. In addition, I have found that only a relatively minor proportion of liquid honey compared to the weight of citrus peel is necessary in order to realize the desired tenderizing effect. For example, as little as about 3 to 5% honey based on the weight of citrus peel is adequate in many cases to obtain an acceptable tenderized citrus peel product. As an upper limit, it is seldom necessary to use more than about 15 to 20% honey based on the weight of citrus peel.

Although the tenderizing or plasticizing action of the liquid honey on the citrus peel is the most significant and novel effect here involved, it may also be pointed out that the use of honey contributes other important qualities to the final product. For example, it is known that honey possesses excellent preservative powers and therefore serves to discourage mold growth and to prevent deterioration of the citrus peel. Insofar as sweetening is concerned, honey is a substantially more powerful sweetening agent than sugar. For example, one gallon of honey containing slightly more than 9 pounds of total sugar has a sweetening power equivalent to approximately 11¼ pounds of granulated sugar. Furthermore, honey has the marked property of intensifying and preserving the initial flavor of the citrus peel. It is also well known to commercial bakers and confectioners that the presence of honey imparts a certain natural freshness which is highly desirable in baked goods.

In practicing my invention, it is possible to take advantage of the tenderizing action of liquid honey on citrus peel in several different ways. For example, if the sugar syrup-citrus peel combination is economically feasible and desired for any particular usage, I can overcome the objectionable toughness of the citrus peel of this type of product by incorporating a predetermined minor amount of liquid honey with the corn syrup, cane sugar syrup, or other like material. However, to take full advantage of the combined properties of honey, I prefer to prepare a citrus peel concentrate consisting essentially of the shredded or ground citrus peel and a relatively minor amount of liquid honey, e. g. from about 5% to about 20% based on the weight of the citrus peel. Obviously, this concentrate is a highly desirable product from the viewpoint of the commercial baker or confectioner inasmuch as the product contains citrus peel in high concentrations and can readily be marketed in bulk quantities without excessive cost. Depending upon the manner of packaging of the product and various statutory regulations, the concentrate may also contain a small amount of a suitable chemical preservative such as sodium benzoate or sodium propionate.

Any of the well known citrus fruit peels may be employed such as orange, lemon, lime, tangerine or grapefruit peels. From a manufacturing viewpoint, the peel is preferably selected from top grade fruit and is utilized immediately after the fruit has passed through the cannery or other processing plant for the extraction of the juice. Various types of honey may be employed such as buckwheat honey, clover honey, etc. In many cases it will be most desirable to utilize a water-white grade of honey although the darker grades of honey can also be employed if desired. In the case of the darker grades of honey, it may sometimes be expedient to subject the honey to pretreatment for purposes of decolorization and deflavoring. Such pre-treatment may comprise, for example, heating the liquid honey and filtering the same through a bed of adsorbent material such as diatomaceous earth, charcoal, etc., or treating with a resin ion exchange agent.

By way of specific example, a suitable citrus peel concentrate may be prepared according to my invention by shredding or grinding 20 pounds of orange peels to the desired degree of fineness or subdivision. The subdivided orange peel is then combined in a mixing kettle with from about 1 to about 4 pounds of honey. Preferably, the honey is preheated to a suitable working temperature such as from about 125° F. to about 200° F. In many instances an upper temperature limit of about 175° F. will be sufficient. The mixture of honey and citrus peel is then agitated or mixed in the kettle with the application of heat to maintain the temperature of the honey. The mixing or processing may be carried out for a period of about ½ hour to 1 hour or even longer in order to impart the desired tenderness to the citrus peel. The length of the processing period and the particular temperature employed will depend upon whether or not a chemical preservative is to be added. If a preservative is used, I prefer to add the preservative to the honey and preheat the same and then mix in the subdivided citrus peel. A processing period of about ½ hour is usually adequate to obtain a homogeneous product having the desired degree of tenderness in the citrus peel. In this case the product containing the preservative can be packaged in any desired type of container such as barrels, coated drums, or plastic lined shipping cartons. If no preservative is to be added, a somewhat longer heat processing period must be employed to insure sterilization, and in such case the product is packaged in hermetically sealed containers.

From the foregoing, it will be seen that my invention provides a novel and improved citrus peel product which can be shipped over long distances and stored for long periods of time without deterioration and which, in the preferred concentrated form of the product, consists mostly of citrus peel. In addition, the presence of the honey imparts and maintains a highly desirable tenderness to the citrus peel fibers thereby overcoming the principal objection to this type of product as heretofore known. The product of my invention is also characterized by resistance to flavor deterioration during storage. The product is also obtainable at minimum cost so that it makes possible a greatly expanded use of citrus peel in the baking and confectionery trades.

I claim:

1. A citrus peel product comprising subdivided citrus peel and liquid honey, the subdivided citrus peel being of sufficient particle size to possess a tendency to become tough, and the honey exerting a plasticizing and tenderizing effect on the peel.

2. A citrus peel product comprising ground or shredded peels of citrus fruit of sufficient particle size to exhibit a tendency toward toughness, and a medium including liquid honey as a tenderizer for the peels.

3. A citrus peel product comprising relatively small pieces of citrus fruit peel of sufficient size so that the pieces tend to become tough and unpalatable and a sufficient amount of liquid honey to effect tenderizing of said peel.

4. A citrus peel product comprising subdivided citrus peel and a minor amount of liquid honey, the subdivided citrus peel being of sufficient particle size to possess a tendency to become tough, and the honey exerting a plasticizing and tenderizing effect on the peel.

5. A citrus peel product comprising subdivided citrus peel of sufficient particle size to exhibit a tendency toward toughness, and a relatively thick sugar syrup with a minor amount of liquid honey as a tenderizer for said peel.

6. A citrus peel concentrate consisting essentially of subdivided citrus peel and a minor amount of liquid honey, the subdivided citrus peel being of sufficient particle size to possess a tendency to become tough, and the honey exerting a plasticizing and tenderizing effect on the peel.

7. A citrus peel concentrate consisting essentially of subdivided citrus peel and from about 5% to about 20% of liquid honey based on the weight of the peel, the subdivided citrus peel being of sufficient particle size to possess a tendency to become tough, and the honey exerting a plasticizing and tenderizing effect on the peel.

8. A citrus peel concentrate consisting essentially of subdivided citrus peel, a minor percentage by weight of liquid honey, and a small amount of a chemical preservative for the peel, the subdivided citrus peel being of sufficient particle size to possess a tendency to become tough, and the honey exerting a plasticizing and tenderizing effect on the peel.

9. A process for preparing a citrus peel product which comprises subdividing citrus peel to particles of sufficient size so that they tend to become tough, and compositing the subdivided citrus peel with a minor quantity of liquid honey.

10. A process for preparing a citrus peel product which comprises preheating liquid honey to a temperature of from about 125° F. to about 200° F. and mixing subdivided citrus peel with the heated honey, the subdivided citrus peel being of sufficient particle size to possess a tendency to become tough, and the honey exerting a plasticizing and tenderizing effect on the peel.

11. A process for preparing a citrus peel product which comprises adding a small amount of a chemical preservative to liquid honey, preheating the same to a temperature of from about 125° F. to about 200° F., and mixing subdivided citrus peel with the heated honey containing the preservative, the subdivided citrus peel being of sufficient particle size to possess a tendency to become tough, and the honey exerting a plasticizing and tenderizing effect on the peel.

References Cited in the file of this patent

UNITED STATES PATENTS

| | | |
|---|---|---|
| 2,219,026 | Webb et al. | Oct. 22, 1940 |
| 2,499,375 | Erickson | Mar. 7, 1950 |
| 2,556,579 | Forkner | June 12, 1951 |
| 2,573,750 | White | Nov. 6, 1951 |

OTHER REFERENCES

"Honey and Its Uses in the Home," Farmers' Bulletin 653, United States Department of Agriculture, Washington, D. C., issued April 7, 1915, slightly revised August 1922, pages 11–15.